United States Patent
Matsuoka

(10) Patent No.: US 11,934,041 B2
(45) Date of Patent: Mar. 19, 2024

(54) SPECTACLE LENS

(71) Applicant: HOYA LENS THAILAND LTD., Pathumthani (TH)

(72) Inventor: Shohei Matsuoka, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 225 days.

(21) Appl. No.: 17/332,497

(22) Filed: May 27, 2021

(65) Prior Publication Data

US 2021/0286195 A1     Sep. 16, 2021

Related U.S. Application Data

(63) Continuation of application No. PCT/JP2019/050730, filed on Dec. 25, 2019.

(30) Foreign Application Priority Data

Dec. 28, 2018 (JP) ................. 2018-248243

(51) Int. Cl.
*G02C 7/02* (2006.01)
*G02B 1/14* (2015.01)

(52) U.S. Cl.
CPC .... *G02C 7/02* (2013.01); *G02B 1/14* (2015.01)

(58) Field of Classification Search
CPC .......... G02C 7/02; G02C 7/165; G02C 7/022; G02B 1/14; G02B 1/115; G02B 5/0215; G02B 5/0294

See application file for complete search history.

(56) References Cited

U.S. PATENT DOCUMENTS

| 4,989,967 A | 2/1991 | Matsuda |
| 2009/0115962 A1 | 5/2009 | Bovet et al. |
| 2012/0200821 A1 | 8/2012 | Arai et al. |

(Continued)

FOREIGN PATENT DOCUMENTS

| CN | 2563595 Y | 7/2003 |
| CN | 102597855 A | 7/2012 |

(Continued)

OTHER PUBLICATIONS

Machine translation of FR 2901370 A3 (Year: 2007).*

(Continued)

*Primary Examiner* — Darryl J Collins
*Assistant Examiner* — Matthew Y Lee
(74) *Attorney, Agent, or Firm* — Oliff PLC

(57) ABSTRACT

A spectacle lens according to the first embodiment of the present disclosure includes: a lens body; and a contrast adjustment section provided on or in the lens body and including a dot-portion group in which dot portions are arranged, wherein the arrangement of the dot portions is non-uniform. A spectacle lens according to the second embodiment of the present disclosure includes: a lens body; and a contrast adjustment section provided on or in the lens body and including a dot-portion group in which dot portions are arranged, wherein the dot-portion group includes dot portions each having an aspect ratio, which is the ratio of the length in the short-axis direction to the length in the long-axis direction in the plan-view shape, of less than 1.

15 Claims, 12 Drawing Sheets

(56) References Cited

U.S. PATENT DOCUMENTS

| | | |
|---|---|---|
| 2016/0377884 A1* | 12/2016 | Lau .................. G02C 7/022 |
| | | 351/159.05 |
| 2017/0131567 A1 | 5/2017 | To et al. |
| 2017/0276959 A1 | 9/2017 | Bowers |
| 2018/0039096 A1* | 2/2018 | Shioya ............... G02C 7/022 |
| 2018/0292754 A1 | 10/2018 | Kikuchi et al. |
| 2019/0033619 A1* | 1/2019 | Neitz .................. G02C 7/04 |
| 2019/0235279 A1* | 8/2019 | Hones ................ G02C 7/022 |
| 2020/0012123 A1* | 1/2020 | Newman ............. G02C 7/022 |

FOREIGN PATENT DOCUMENTS

| | | | |
|---|---|---|---|
| EP | 1 904 885 B1 | 11/2018 | |
| FR | 2901370 A3 * | 11/2007 | ............ G02C 7/02 |
| FR | 2 918 463 A1 | 1/2009 | |
| JP | 2008-55253 A | 3/2008 | |
| JP | 2017-510851 A | 4/2017 | |
| JP | 2018-180168 A | 11/2018 | |
| WO | 2016/125808 A1 | 8/2016 | |
| WO | 2018/026697 A1 | 2/2018 | |

OTHER PUBLICATIONS

Partial Translation of the Nov. 7, 2022 Office Action Issued in Chinese Patent Application No. 201980085451.0.
Zhao, Qing, "Training Materials for Employees of Glasses Retail Enterprises", China Metrology Publishing House, Dec. 31, 2001, pp. 202.
Mar. 24, 2020 Search Report issued in International Patent Application No. PCT/JP2019/050730.

* cited by examiner

[Fig. 1]
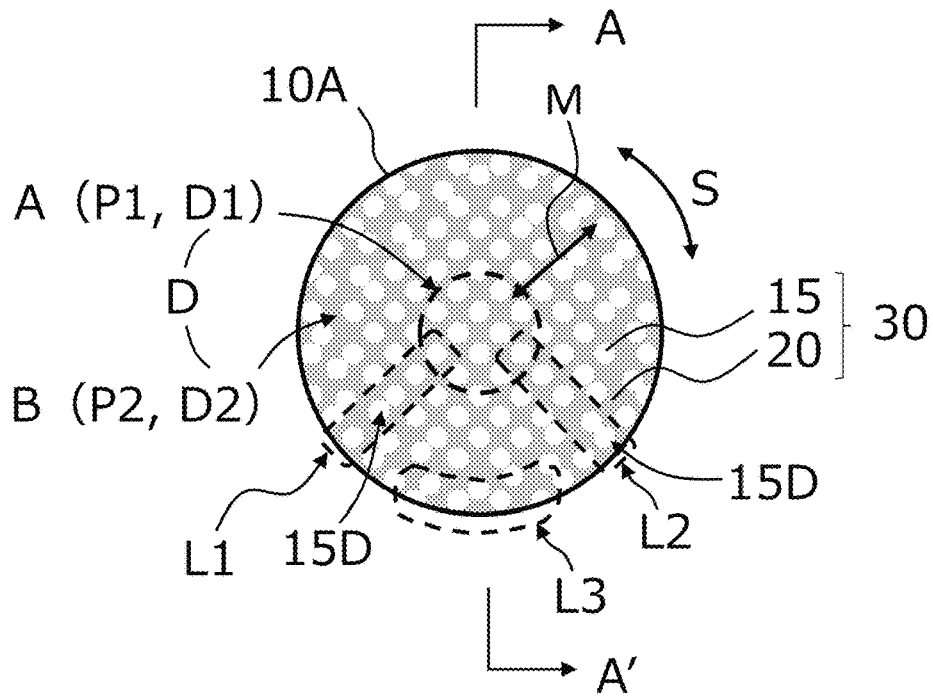
[Fig. 2]
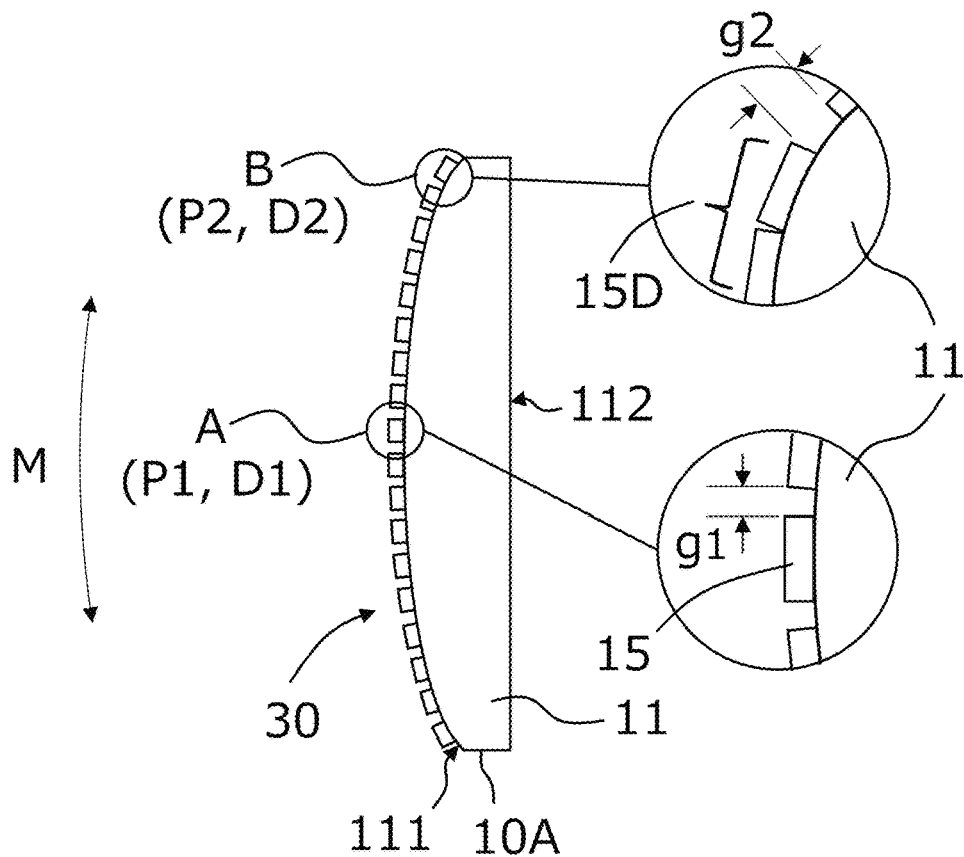

[Fig. 3]
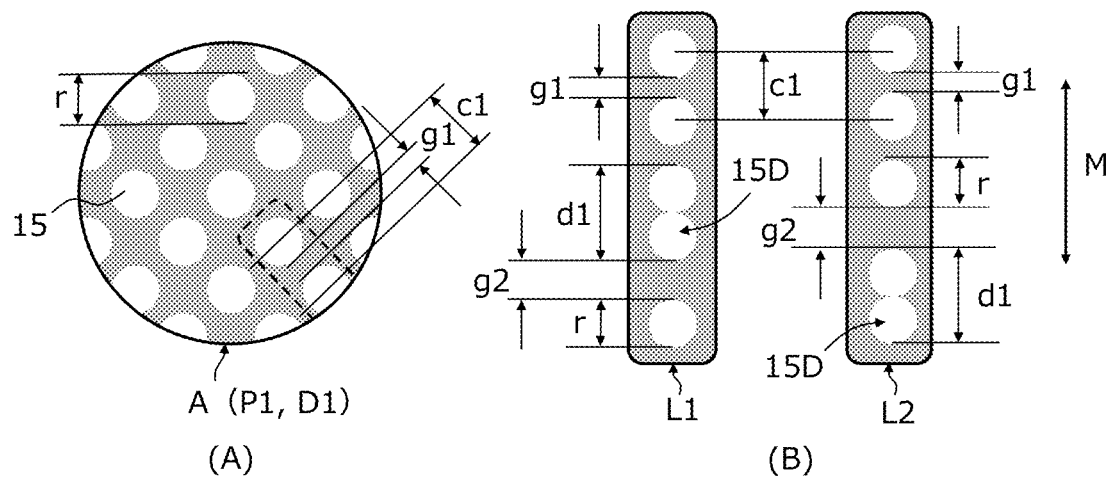
[Fig. 4]
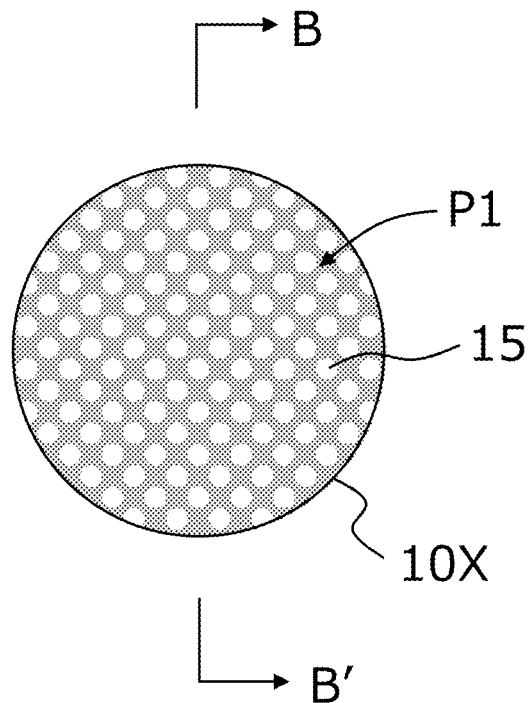

[Fig. 5]
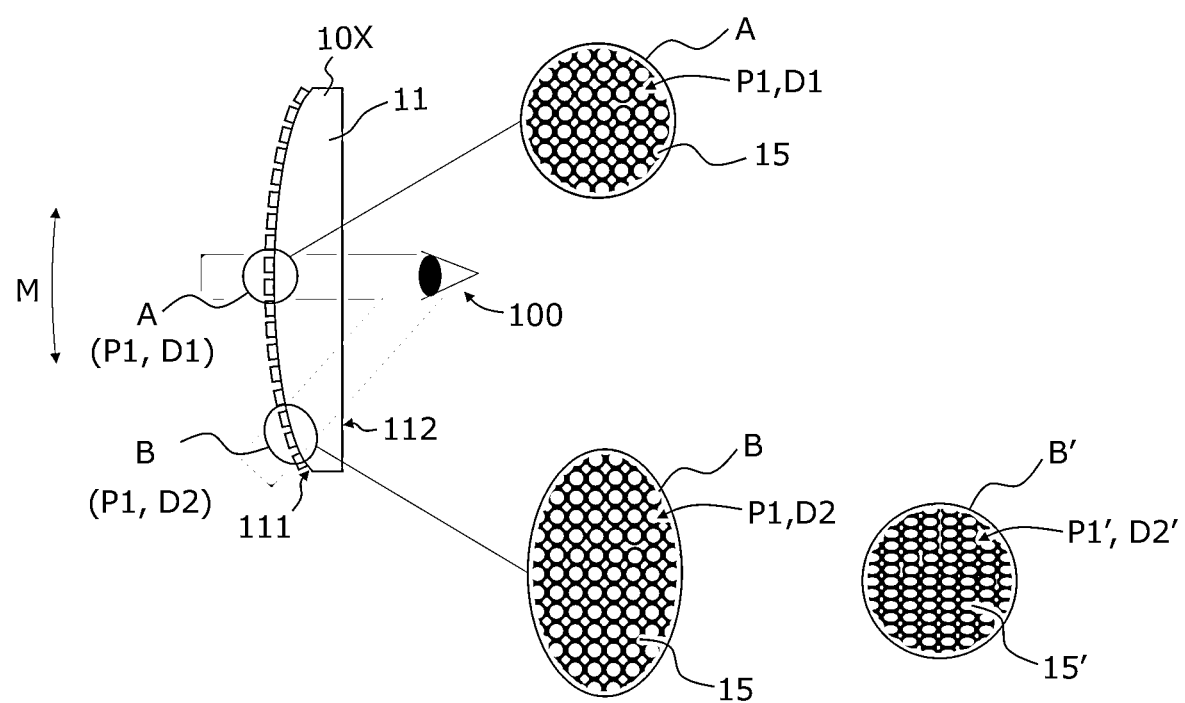

[Fig. 6]
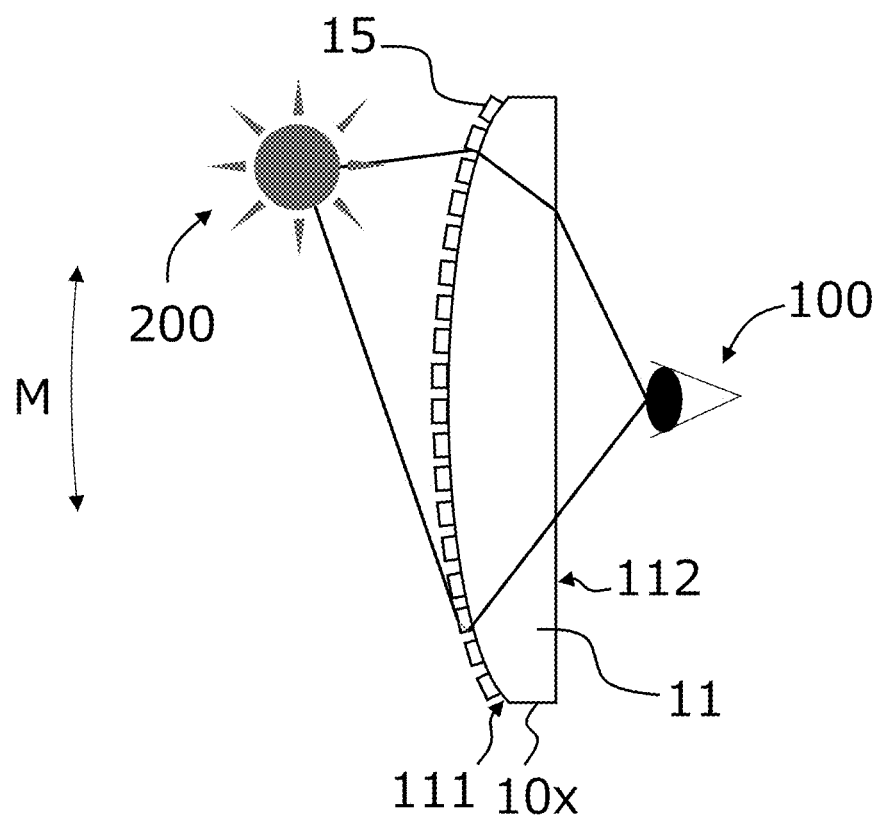

[Fig. 7]
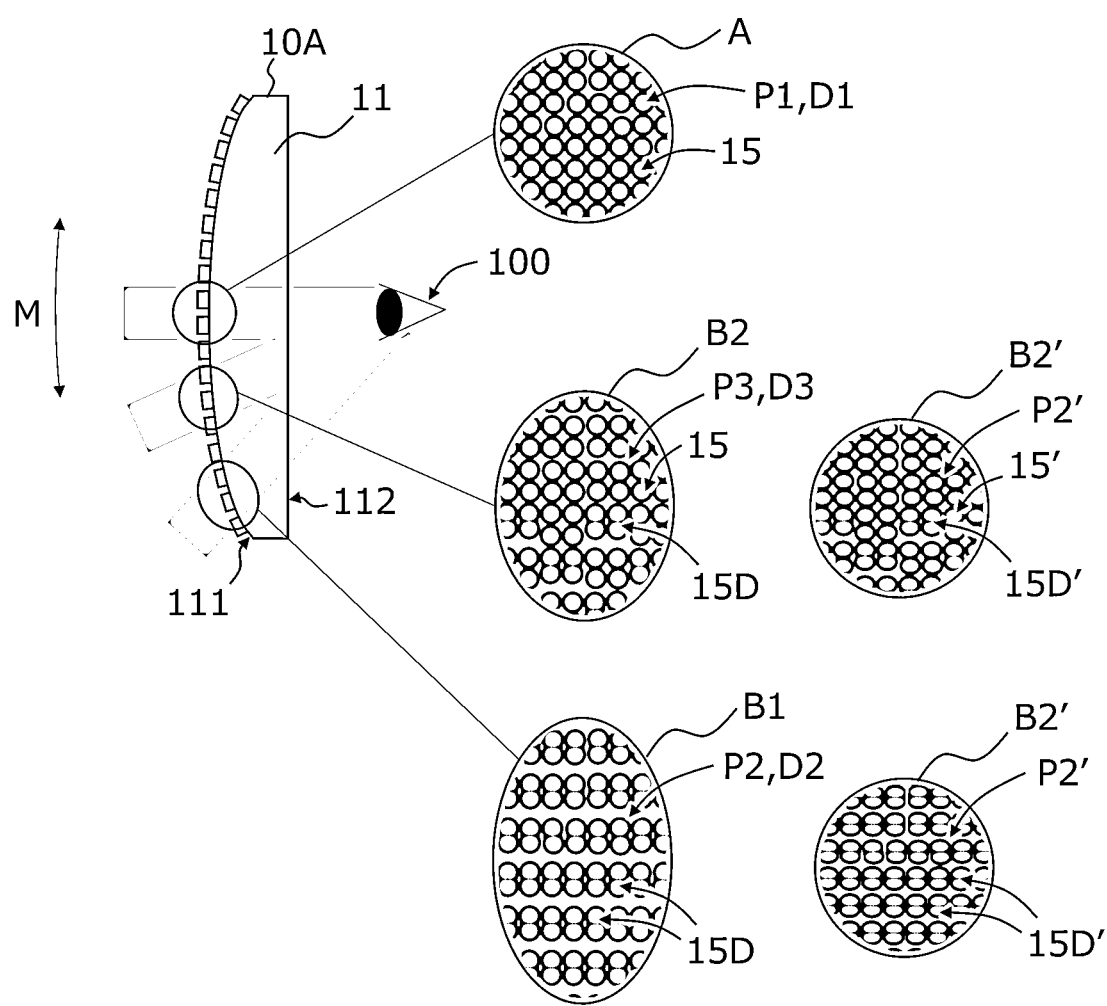

[Fig. 8]
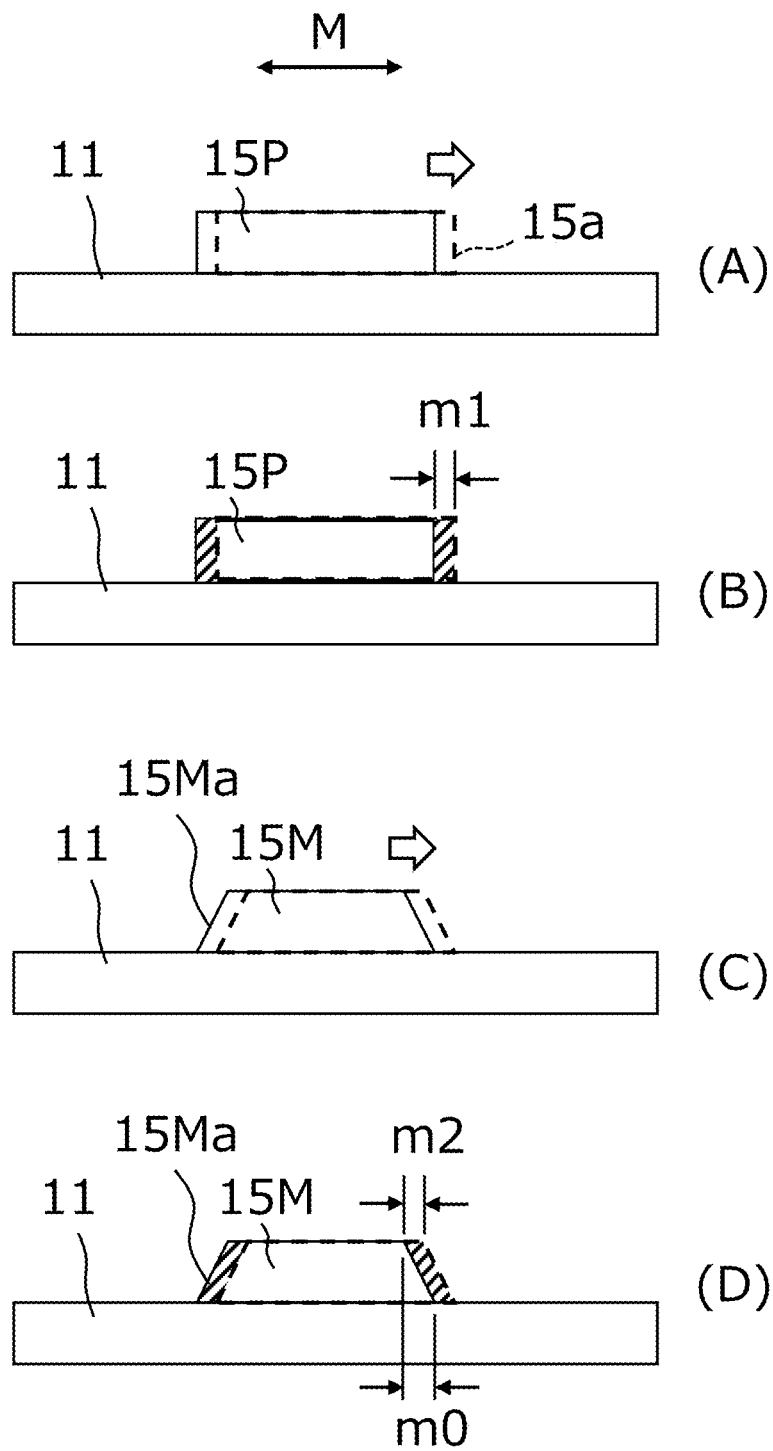

[Fig. 9]
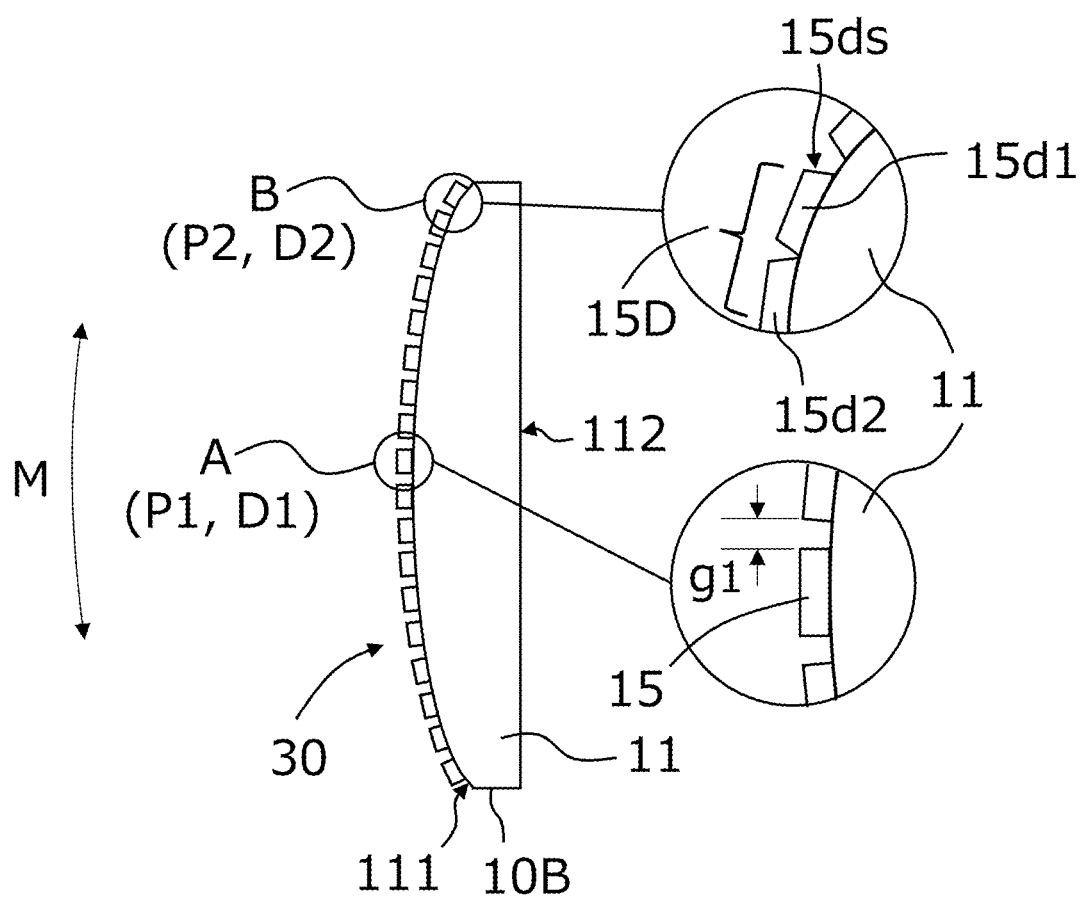

[Fig. 10]
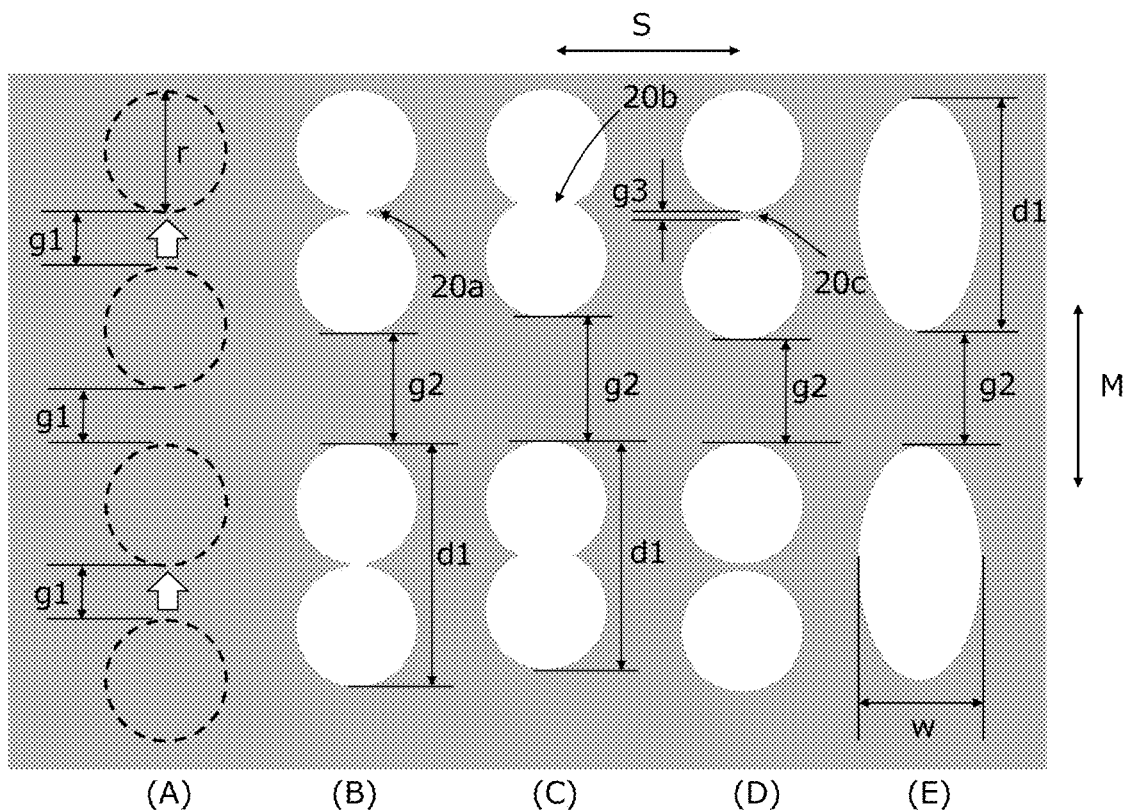
(A) (B) (C) (D) (E)
[Fig. 11]
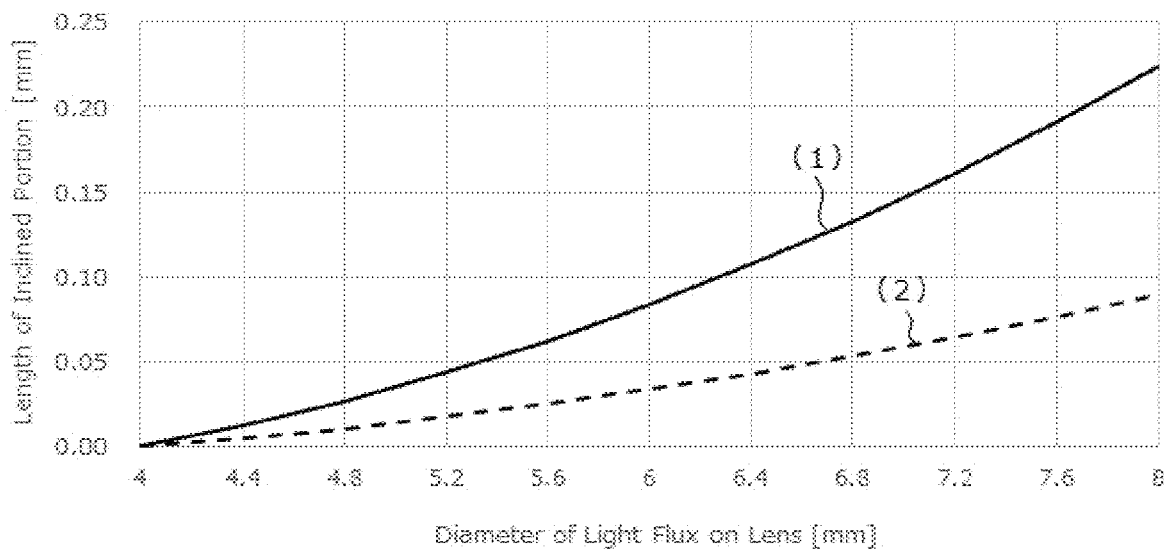

[Fig. 12]
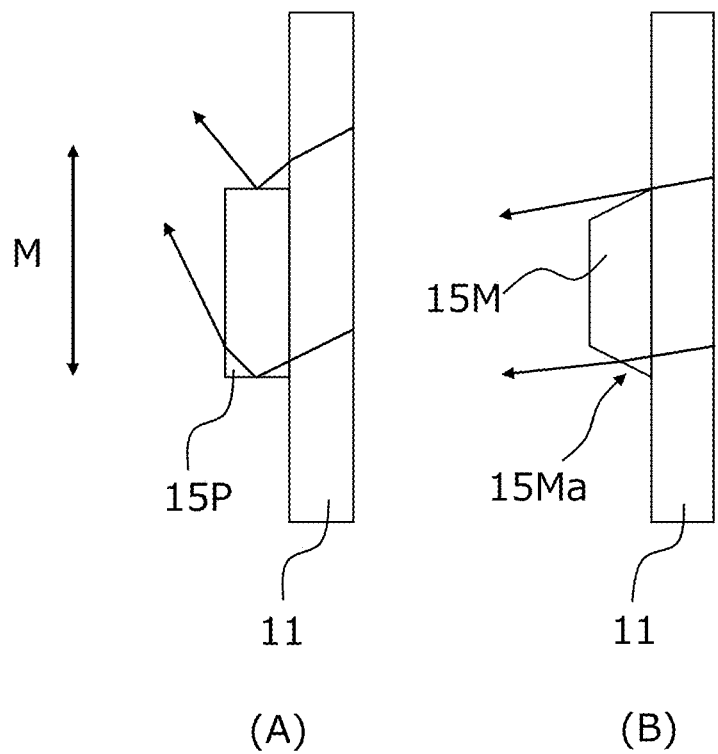
(A)          (B)
[Fig. 13]
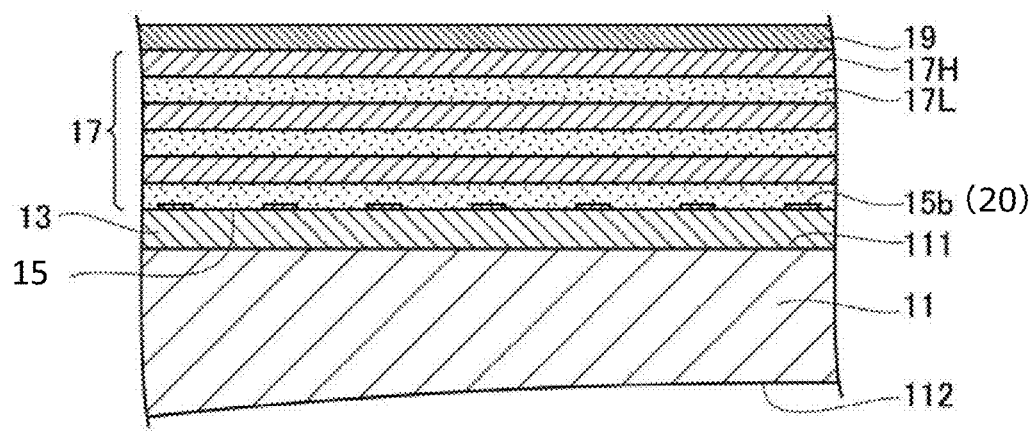

[Fig. 14]
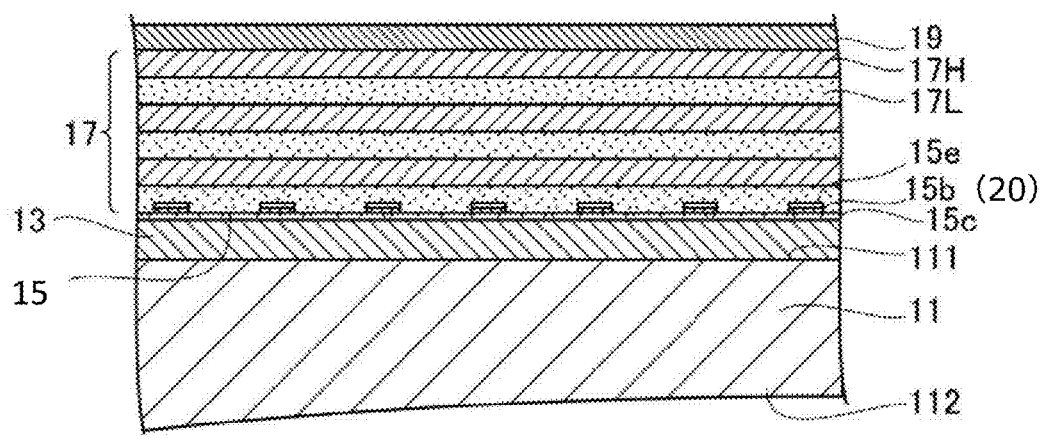
[Fig. 15]
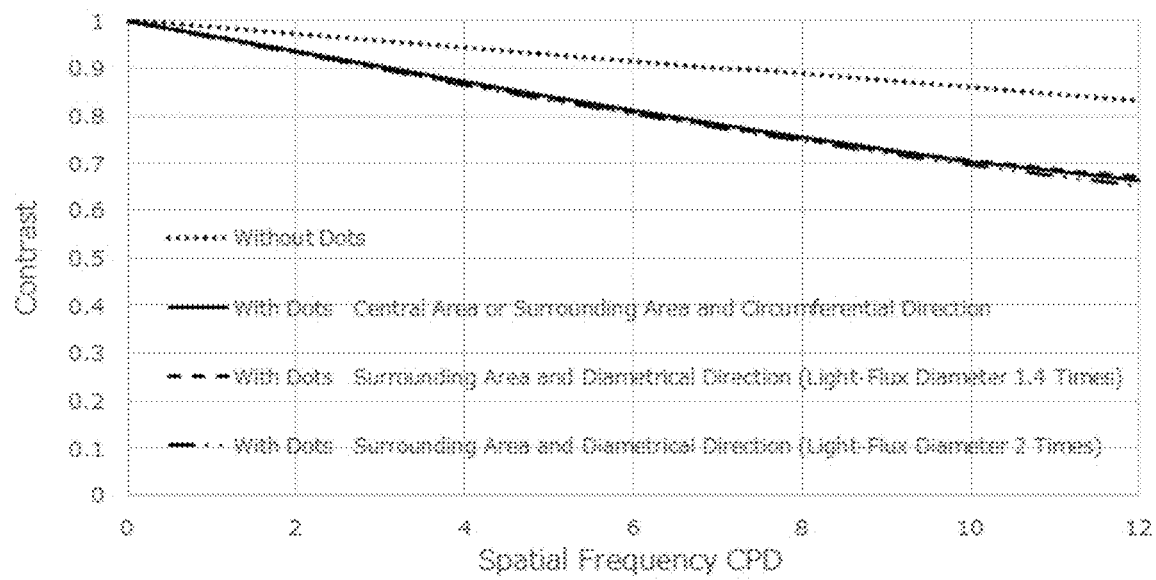

[Fig. 16]
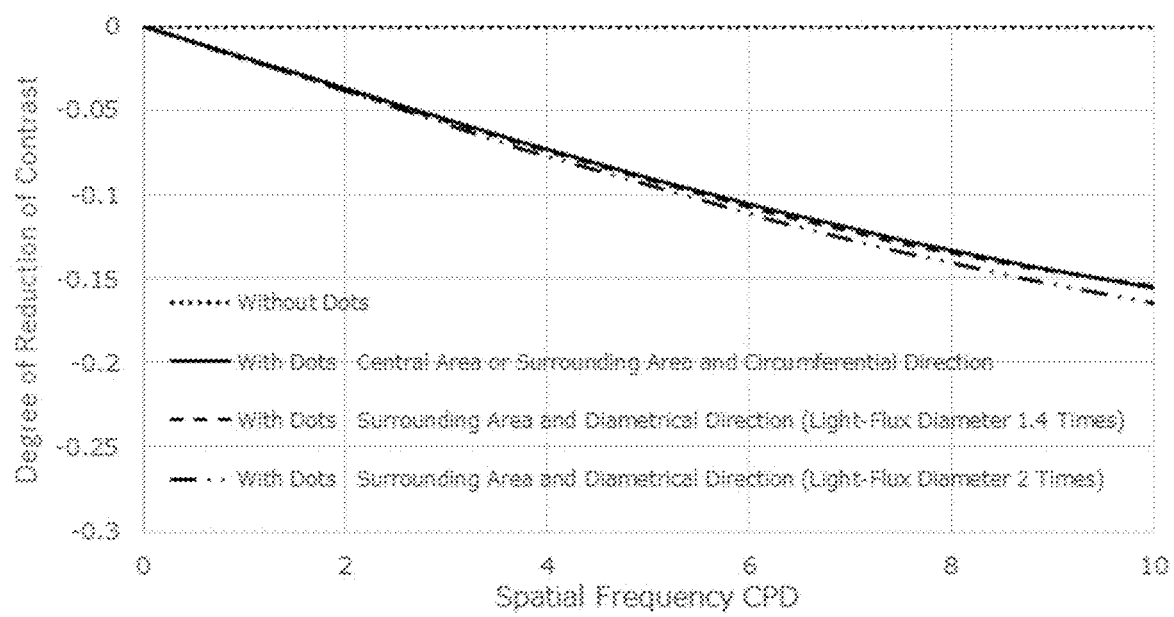
[Fig. 17]
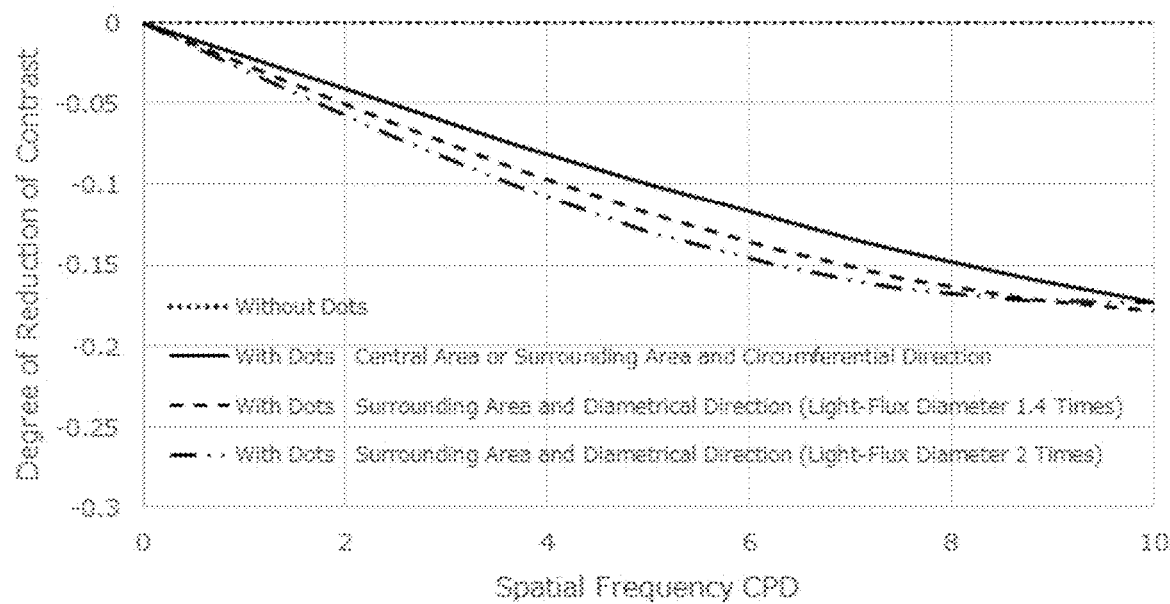

[Fig. 18]
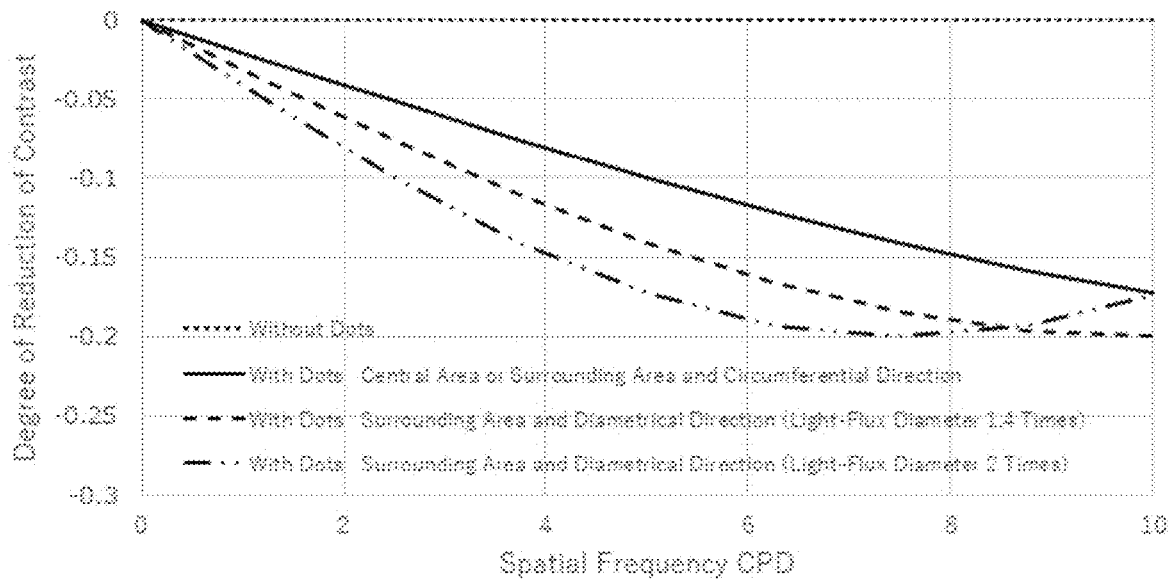
[Fig. 19]
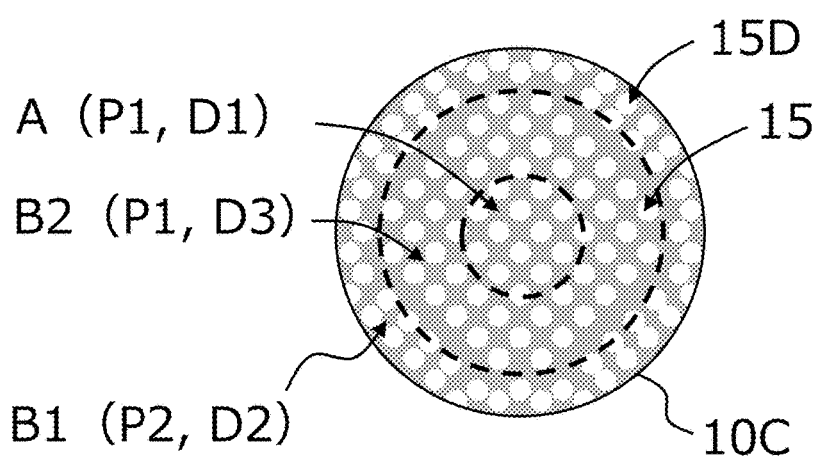

SPECTACLE LENS

CROSS-REFERENCE TO RELATED APPLICATIONS

The present application is a continuation application of International Application No. PCT/JP2019/050730, filed Dec. 25, 2019, which claims priority to Japanese Patent Applications No. 2018-248243, filed Dec. 28, 2018. The contents of these applications are incorporated herein by reference in their entirety.

TECHNICAL FIELD

The present disclosure relates to a spectacle lens.

BACKGROUND ART

A spectacle lens has various layers covering a lens substrate, such as a hard coat layer for preventing scratching of the lens substrate, an antireflective layer for preventing reflection of light from the surface of the lens, and a water-repellent layer for preventing a water stain on the lens. Further, an optical member with a predetermined pattern formed by coating, and a lens having dots arranged in an isotropic pattern have recently been proposed (see, for example, PTLs 1 and 2).

CITATION LIST

Patent Literature

PTL 1: JP 2008-55253 A
PTL 2: WO 2016/125808

SUMMARY

Technical Problem

PTL 2 describes a pattern of dots arranged isotropically reduces the overall contrast of a lens, mainly in a low spatial frequency range, by a predetermined percentage, and thereby enables assisting the wearer in focusing. However, the lens having dots arranged in an isotropic pattern has the following problems.

At first, there is a problem, in a peripheral area where light flux enters obliquely, a difference exists in the degree of the contrast reduction effect between the diametrical direction and the circumferential direction of the lens. This sometimes causes an uncomfortable feeling to the user. The second problem is that stray light is likely to be generated by a dot pattern in a peripheral area of the lens.

A first embodiment of the present disclosure relates to a spectacle lens which enables preventing the direction-dependent difference in the contrast reduction effect even in a peripheral area of the lens while having the contrast reduction effect mainly in a low spatial frequency range (e.g., a spatial frequency range of not more than 30 cpd (cycle per degree)).

A second embodiment of the present disclosure relates to a spectacle lens which enables preventing the generation of stray light while having the contrast reduction effect.

Solution to Problem

The spectacle lens according to the first embodiment of the present disclosure includes:

a lens body; and
a contrast adjustment section provided on or in the lens body and including a dot-portion group in which dot portions are arranged,
wherein the arrangement of the dot portions are arranged is non-uniform.

The spectacle lens according to the second embodiment of the present disclosure includes:

a lens body; and
a contrast adjustment section provided on or in the lens body and including a dot-portion group in which dot portions are arranged,
wherein the dot-portion group includes dot portions each having an aspect ratio, which is the ratio of the length in the short-axis direction to the length in the long-axis direction in the plan-view shape, of less than 1.

Advantageous Effects

The first embodiment of the present disclosure provides a spectacle lens which enables ensuring the contrast reduction effect without depending on directions even in a peripheral area of the spectacle lens.

The second embodiment of the present disclosure provides a spectacle lens which enables preventing the generation of stray light while having the contrast reduction effect.

BRIEF DESCRIPTION OF DRAWINGS

FIG. 1 is a schematic plan view of a spectacle lens 10A according to the first embodiment of the present disclosure.

FIG. 2 shows an A-A' cross-sectional view of the spectacle lens 10A and partially enlarged views thereof.

FIG. 3 shows diagrams illustrating an arrangement of dot portions 15.

FIG. 4 is a schematic plan view of a spectacle lens 10X having dot portions arranged isotropically and uniformly over the entire surface.

FIG. 5 is a diagram illustrating a problem that may occur in the spectacle lens 10X.

FIG. 6 is a diagram illustrating another problem that may occur in the spectacle lens 10X.

FIG. 7 is a diagram illustrating the workings of the spectacle lens 10A.

FIG. 8 shows diagrams illustrating, based on an autocorrelation method, an influence exerted on contrast by a protruding structure provided in a spectacle lens and having a protruding shape in diametrical cross-section.

FIG. 9 shows an A-A' cross-sectional view of a spectacle lens 10B according to the second embodiment of the present disclosure, and partially enlarged views thereof.

FIG. 10 shows diagrams illustrating exemplary configurations of a coupled dot portion 15D.

FIG. 11 is a graph showing the influence of the diametrical length of an inclined side portion of a protruding structure on the diameter of light flux on a spectacle lens.

FIG. 12 shows diagrams illustrating the workings of a protruding structure provided in a spectacle lens and having a trapezoidal shape in diametrical cross-section.

FIG. 13 is a partially enlarged diametrical cross-sectional view showing the structure of layers on a spectacle lens 10A1.

FIG. 14 is a partially enlarged diametrical cross-sectional view showing the structure of layers on a spectacle lens 10A2.

FIG. 15 is a diagram showing the results of a simulation of the Modulation Transfer Function (MTF) characteristics of a spectacle lens having dot portions arranged non-uniformly.

FIG. 16 is a diagram showing the simulation results of FIG. 15, with the ordinate axis representing the degree of reduction of contrast compared to a spectacle lens having no dot portions.

FIG. 17 is a diagram showing the results of a simulation of the MTF characteristics of a spectacle lens having dot portions arranged non-uniformly in a pattern different from the exemplar of FIG. 16, with the ordinate axis representing the degree of reduction of contrast compared to a spectacle lens having no dot portions.

FIG. 18 is a diagram showing the results of a simulation of the MTF characteristics of a spectacle lens having dot portions arranged isotropically and uniformly, with the ordinate axis representing the degree of reduction of contrast compared to a spectacle lens having no dot portions.

FIG. 19 is a schematic plan view of a spectacle lens 10C according to another embodiment of the present disclosure.

DESCRIPTION OF EMBODIMENTS

Definitions of terms used throughout the specification are given below.

"Arranged isotropically and uniformly" means a two-dimensional arrangement at regular intervals.

"Dot portions are arranged at regular intervals" means an arrangement in which the distance from the center of any dot portion to the center of an adjacent dot portion is either the same or within a predetermined margin of error (e.g. within ±10% of an average value).

"Arrangement is non-uniform" indicates inclusion of an arrangement at irregular intervals, such as an arrangement in which the distance between the centers of some adjacent dot portions exceeds a predetermined margin of error, an arrangement in which the distance between the centers of adjacent dot portions varies with the diametrical position on a spectacle lens, or a random arrangement.

In the below-described embodiments of the present disclosure, a spectacle lens includes, at least in a central area, dot portions arranged at regular intervals.

"The diametrical direction of a spectacle lens" refers to a direction from the center of the lens toward the periphery along a main surface of the lens. "The diametrical direction of a spectacle lens" is sometimes referred to herein simply as "diametrical direction M".

"The circumferential direction of a spectacle lens" refers to a direction along a main surface of the lens and intersecting the diametrical direction of the lens. "The circumferential direction of a spectacle lens" is sometimes referred to herein simply as "circumferential direction S".

"Aspect ratio" refers to a ratio between two lengths in two orthogonal directions along a main surface of a lens. In particular, in the present disclosure, "the aspect ratio of a dot portion" refers to the ratio of the length of the dot portion in the short-axis direction to the length of the dot portion in the long-axis direction in the plan-view shape of the dot portion.

Embodiments and examples of the present disclosure will be described below. The same symbols are used for the same or equivalent components or elements, and a description thereof may not be repeated. When reference is made to a number, an amount, etc. in the below-described embodiments and examples, the scope of the present disclosure is not necessarily limited to the number, the amount, etc. unless otherwise explicitly indicated. In the following embodiments, the below-described components or elements are each not necessarily essential unless otherwise explicitly indicated.

First Embodiment

The first embodiment of the present disclosure will now be described.

[Structure of Spectacle Lens 10A]

FIG. 1 is a schematic plan view of a spectacle lens 10A according to the first embodiment of the present disclosure. The structure of the spectacle lens 10A will be described with reference to FIG. 1.

The spectacle lens 10A includes a lens body, and a contrast adjustment section provided on the lens body. The lens body is composed of the below-described lens substrate 11.

A number of fine dot portions 15 are arranged on the entire surface of the lens body, and form a dot-portion group D. The dot-portion group D constitutes a contrast adjustment section 30 which functions to adjust the contrast of the spectacle lens 10A.

Each dot portion 15 included in the dot-portion group D has a perfectly circular shape in a plan view. The arrangement pattern of dot portions 15 in a central area A of the spectacle lens 10A differs from the one in a surrounding area B located outside the central area A.

In the dot-portion group (first dot-portion group) D1 of the central area A, dot portions 15 are arranged in an isotropic arrangement pattern P1. Thus, the distances between the centers (arrangement pitch) of closest adjacent dot portions (closest dot portions) are the same, and the shortest distances between the peripheries of closest dot portions are the same. The structure of the dot-portion group D1, having the dot portions 15 arranged in the isotropic arrangement pattern P1, effectively reduces contrast in a low spatial frequency range (e.g., a spatial frequency range of not more than 30 cpd). If the arrangement pattern P1 has a degree of non-uniformity, a low-pass filter effect, which reduces contrast in a high spatial frequency range (e.g., a spatial frequency range of more than 30 cpd), may be caused as described, for example, in Japanese Patent Laid-Open Publication No. 2016-212333. In the first embodiment of the present disclosure, therefore, the isotropic arrangement pattern P1 is employed for the dot-portion group D1.

In the dot-portion group (second dot-portion group) D2 of the surrounding area B, dot portions 15 are arranged in a non-uniform arrangement pattern P2. Thus, in the diametrical direction M, dot portions 15 are arranged uniformly in the central area A, while dot portions 15 are arranged non-uniformly in the surrounding area B. The structure of the dot-portion group D2 also effectively reduces contrast in a low spatial frequency range. Thus, the non-uniformity of the arrangement pattern P2 is adjusted to such an extent that the low-pass filter effect is not be dominant.

In particular, in the surrounding area B, the distances between some adjacent dots 15 in the diametrical direction M of the spectacle lens are long as compared to the central area A. Further, the surrounding area B has pairs of dot portions, coupled together, in the diametrical direction M. Such a dot-portion pair is hereinafter referred to as a coupled dot portion 15D. The length of a coupled dot portion 15D in the diametrical direction M is longer than the corresponding length of each of the dot portions 15 constituting the coupled dot portion 15D.

A more specific arrangement of the dot portions 15 will be described in detail below under the heading "Workings of the Contrast Adjustment Section".

For the dot portions 15 of the dot-portion group D2 of the surrounding area B, some adjacent dot portions are intentionally disposed farther apart in the diametrical direction M, some are closer to, and some are in contact with each other in order to achieve the below-described effect. The arrangement pattern P2 thus differs from arrangement patterns in which some dot portions, which should be arranged uniformly, are displaced or elongated in the circumferential direction e.g. due to an error upon the formation of the dot portions.

On the other hand, the dot-portion group D includes, in the circumferential direction S, a plurality of arrangements which differ in the arrangement of dot portions 15 in the diametrical direction M, as shown by the symbols L1 and L2 in FIG. 1. Thus, the first arrangement L1 and the second arrangement L2, which differ from each other in the arrangement pattern of dot portions 15 in the diametrical direction M, are located at different positions in the circumferential direction S.

Compared to a spectacle lens having a dot-portion group consisting of dot portions arranged uniformly over the entire lens surface, the arrangement of the dot portions of the dot-portion group D may be regarded as non-uniform as a whole.

FIG. 2 shows a schematic A-A' cross-sectional view of the spectacle lens 10A and partially enlarged views thereof. As shown in FIG. 2, the spectacle lens 10A includes a spectacle lens substrate 11 (hereinafter also referred to simply as the "lens substrate") which constitutes the lens body. The lens substrate 11 has a first main surface 111 and a second main surface 112. Protrusions and recesses, constituting the dot portions 15, are formed on the first main surface 111. In the schematic cross-sectional view of the entire spectacle lens 10A in FIG. 2, the dot portions 15 on the first main surface 111 are depicted in a simplified form to clearly illustrate the protruding/recessed structure. The same holds true for the below-described FIGS. 5 through 7, and 9. The structure and arrangement of the dot portions 15 of this embodiment will be described in more detail with reference to other drawings, etc. While other layers are provided on the first main surface 111 of the lens substrate 11, depiction of such layers is omitted from FIG. 2, etc. The structure of layers of the spectacle lens, including other layers, and the materials of the respective layers will be described later.

<Contrast Adjustment Section>

The contrast adjustment section 30 of the spectacle lens 10A has a structure which performs the function of adjusting contrast to assist the wearer in focusing. The contrast adjustment section 30 has, for example, a structure which is provided on the first main surface 111 of the lens substrate 11 of the spectacle lens 10A and which produces a phase difference.

The contrast adjustment section 30 may be formed as a layer on the lens substrate, or formed as a surface structure of the lens by using a mold having a processed portion corresponding to the surface structure, or formed by post-processing of the lens.

When the contrast adjustment section 30 is formed as a layer, it may be formed on the lens substrate either directly or via another layer such as an adhesive layer.

The dot portions, included in the contrast adjustment section 30, may each be a tangible object, or a space surrounded by a tangible object.

The material of the contrast adjustment section 30 may have the same light permeability as or a different light permeability from the lens substrate.

The dot portions may be formed on the surface of the lens substrate or within the lens substrate.

The contrast adjustment section 30 includes a number of fine dot-shaped openings (recessed portions) that constitute the dot portions 15 of the spectacle lens 10A. In the central area A of the spectacle lens 10A, the dot portions 15 are arranged isotropically and uniformly. Isotropic arrangement at an equal pitch of the fine dot-shaped openings allows the contrast adjustment section 30 to provide a contrast reduction effect, thereby assisting the wearer of the spectacle lens 10A in focusing.

The contrast adjustment section 30 is composed of, for example, a metal-containing layer 20. The metal contained in the metal-containing layer 20 is, for example, at least one metal selected from the group consisting of Cr, Ta, Nb, Ti, Zr, Au, Ag, and Al, and may be Cr. The use of a metal-containing layer as the contrast adjustment section 30 may also achieve the effect of preventing electrostatic charging of the spectacle lens.

The contrast adjustment section 30 is obtainable by, for example, ink jet (IJ) printing. In this case, a dotted layer, which is to be finally peeled off, is first printed on the lens substrate by IJ printing, and then the print is covered with a metal-containing layer. Thereafter, the dotted print layer, together with the corresponding portion of the metal-containing layer, is peeled off the lens substrate. In this manner, dot-shaped openings may be formed in the metal-containing layer.

The dot portions may also be formed by a printing method other than IJ printing, or by vapor deposition or the like.

When the dot portions are tangible objectsr, the dot portions may be formed directly on the lens substrate by printing the matter on the lens substrate e.g. by IJ printing.

The contrast adjustment section 30 includes the dot-portion group D in which dot portions 15 are arranged.

The dot-portion group D includes the first dot-portion group D1 lying in the central area A of the lens body, and the second dot-portion group D2 lying in the surrounding area B located outside the central area A. Compared to the first dot-portion group D1, (i) the distances between adjacent dot portions in the diametrical direction of the lens body are longer in the second dot-portion group D2.

In the embodiment illustrated in FIG. 1, the dot portions 15 of the first dot-portion group D1 are arranged in a lattice pattern.

The arrangement of the dot portions of the second dot-portion group D2 corresponds to an arrangement in which dot portions 15 at predetermined positions of the arrangement of the dot portions 15 of the first dot-portion group D1 have been moved in the diametrical direction M of the lens body.

Thus, compared to the first dot-portion group D1, (ii) the lengths of dot portions 15 in the diametrical direction of the lens body are longer in the second dot-portion group D2.

FIG. 3 shows diagrams illustrating the arrangement of dot portions 15. As shown in the enlarged view of FIG. 3(A), in the dot-portion group D1 of the central area A, the distance c1 between any dot portion 15 and the center of an adjacent dot portion 15 is, for example, not less than 0.1 mm, not less than 0.2 mm, or not less than 0.3 mm, and is, for example, not more than 5.0 mm, not more than 3.0 mm, or not more than 1.0 mm.

The shortest distance g1 between the peripheries of any adjacent dot portions 15 is, for example, not less than 0.03 mm, not less than 0.06 mm, or not less than 0.12 mm, and is, for example, not more than 1.6 mm, not more than 1.0 mm, or not more than 0.3 mm.

The diameter r of each dot portion 15 is, for example, not less than 0.01 mm, not less than 0.05 mm, or not less than 0.1 mm, and is, for example, not more than 5.0 mm, not more than 2.0 mm, not more than 1.0 mm, or not more than 0.5 mm.

The ratio of distance c1 to diameter r (c1/r) may be more than 1.0, not less than 1.1, or not less than 1.2, and may be not more than 2.0, not more than 1.8, or not more than 1.5.

The second dot-portion group D2 includes pairs of dot portions coupled together. Such a dot-portion pair forms a coupled dot portion 15D whose length in the diametrical direction M of the lens body is longer than the corresponding length of each of the dot portions 15 constituting the dot-portion pair.

FIG. 3(B) shows enlarged views of the arrangement L1 and the arrangement L2 shown in FIG. 1. The arrangement L1 and the arrangement L2, which are located at different positions in the circumferential direction S, each include coupled dot portions 15D which may be regarded as being formed by moving some dot portions 15 in the diametrical direction M. Therefore, the distance g2 between a coupled dot portion 15D and an adjacent dot portion in the diametrical direction M is longer than the corresponding distance g1 in the first dot-portion group D1 of the central area A.

The length by which a dot portion is to be moved in the diametrical direction M in order to form a coupled dot portion 15D may be set in consideration of the fact that when viewed from the wearer of the spectacle lens, light flux on the spectacle lens, which is entering the lens, is elongated in the diametrical direction M in the surrounding area B. In particular, the movement length may be set so that the above distance g2 optically cancels out the elongation of light flux, and the wearer may perceive the same contrast as in the central area A. The movement distance may be, for example, about 0.02 to 4.5 mm. The length d1 of a coupled dot portion 15D in the diametrical direction M will be described below with reference to FIG. 10.

<Workings of the Contrast Adjustment Section>

The workings of the contrast adjustment section of the spectacle lens according to this embodiment will now be described in comparison with a spectacle lens having dot portions arranged isotropically and uniformly over the entire lens surface. In FIGS. 3 through 7, in order to facilitate easier understanding, the length, the height, etc. of each dot portion are exaggerated, and the number of dot portions is depicted as smaller than the one in reality.

In the following description, dot portions will sometimes be described or illustrated as if they were tangible objects. When a fine structure which may provide a phase difference is provided on the lens body, whether the dot portions are spatial or tangible, the wearer perceives them equivalent, and no significant problem will arise if dot portions are described as if they were tangible objects. Therefore, dot portions will be described and illustrated in such a manner to facilitate the description and illustration.

FIG. 4 is a schematic plan view of a spectacle lens 10X having dot portions arranged isotropically and uniformly over the entire surface. In the spectacle lens 10X, the arrangement pattern is substantially the same at any position on the first main surface of the lens substrate 11.

FIG. 5 is a diagram illustrating a problem that may occur in the spectacle lens 10X. FIG. 5 shows a schematic cross-sectional view on line B-B' of FIG. 4 and partially enlarged views thereof.

As shown in FIG. 5, assuming light coming from an eye 100 of the wearer of the spectacle lens 10X and entering the lens at an incident angle α with respect to a line segment connecting the eye 100 and the center of the spectacle lens 10X, the diameter of light flux on the spectacle lens is elongated by 1/cos α in the diametrical direction M of the spectacle lens.

This is equivalent to the fact that the length of each dot portion and the arrangement pitch are multiplied by cos α in the diametrical direction M of the spectacle lens, as shown in the lower left-side diagram of FIG. 5. Thus, as shown by the symbols B', P1', D2' and 15' in the lower right-side diagram of FIG. 5, the dot portions as perceived by the wearer are compacted in the size of each dot portion in the diametrical direction M and in the distance between adjacent dot portions as compared to the central area A.

Accordingly, the closer to a peripheral end portion in the diametrical direction M of the spectacle lens, the excessively lower the contrast of low-frequency components of incident light, while the contrast of high-frequency components of incident light is not reduced significantly. Thus, in the diametrical direction M of the spectacle lens, the contrast reduction effect varies with position on the spectral lens, making it impossible to obtain desired contrast reduction characteristics.

There is no such variation in the contrast reduction effect in the circumferential direction S of the spectacle lens. The contrast reduction characteristics thus differ between the circumferential direction S and the diametrical direction M. This may cause an uncomfortable feeling to the wearer as if astigmatism had occurred.

FIG. 6 is a diagram illustrating another problem that may occur in the spectacle lens 10X. FIG. 6 is a schematic cross-sectional view on line B-B' of FIG. 4, showing light entering the spectacle lens 10X from the outside.

As shown in FIG. 6, in the surrounding area B of the spectacle lens 10X, the dot portions 15 of the contrast adjustment section 30 are inclined, following the curve of the spectacle lens 10X, and therefore the inclination of the wall surface of each dot portion 15 is relatively large. Consequently, as schematically shown in FIG. 6, stray light resulting from the wall surface of such a dot portion 15 is likely to be generated, such as due to reflection of light, emitted by a light source 200, from the wall surface of the dot portion 15.

FIG. 7 is a diagram illustrating the workings of the spectacle lens 10A. FIG. 7 shows a schematic cross-sectional view on line A-A' of FIG. 1. To facilitate illustration and understanding, FIG. 7 illustrates an exemplar in which part of dot portions, which are arranged uniformly in a lattice pattern, are moved only in the diametrical direction M to make the arrangement of the dot portions non-uniform.

As shown in FIG. 7, in the central area A, dot portions 15 are arranged in an isotropic arrangement pattern P1. In the surrounding area B, dot portions 15 are arranged in a non-isotropic arrangement pattern.

In particular, in a central area A-side second surrounding area B2, dot portions are arranged in an arrangement pattern P3 in which part of dot portions have been moved in the diametrical direction. In a first surrounding area B1 located outside the second surrounding area B2, dot portions are arranged in an arrangement pattern P2 in which more dot portions than in the second surrounding area B2 have been moved in the diametrical direction.

When the wearer of the spectacle lens views an object through the surrounding area B, light flux that enters an eye of the wearer is elongated on the spectacle lens in the diametrical direction. However, since the dot portions in the surrounding area B are arranged in an arrangement pattern in which some dot portions have been moved in the diametrical direction M as described above, the wearer views the object through a pattern of dot portions in which the arrangement pitch in the diametrical direction M is equal to the arrangement pitch in the central area A, as shown with the symbols B2', P2', 15' and 15D' in the right-side diagrams of FIG. 7. Further, since coupling of dot portions is equivalent to elongation of either one of the dot portions in the diametrical direction M, the wearer views an object through the dot-portion group having dot portions each having a length equal to the length of each dot portion of the central area A in the diametrical direction M.

Thus, the spectacle lens 10A enables preventing a direction-dependent difference in the contrast reduction effect in the surrounding area B. The spectacle lens 10A therefore enables to prevent causing an uncomfortable feeling to the wearer and also prevent possible reduction in the function of assisting the wearer in focusing in the surrounding area B.

As with the embodiment illustrated in FIG. 7, in the embodiment illustrate in FIGS. 1 through 3, the dot-portion group D further includes a third dot-portion group D3 lying in a surrounding area B2 which is an intermediate area located between the central area A and a peripheral surrounding area B1.

In the third dot-portion group D3, dot portions 15 are arranged in an arrangement pattern P3 in which the distance between dot portions 15 in the diametrical direction M of the lens body is intermediate between the corresponding distance between dot portions 15 in the first dot-portion group D1 and the corresponding distance between dot portions 15 in the second dot-portion group D2.

By gradually varying the dot portion arrangement pattern in the diametrical direction M in at least three areas, the wearer of the spectacle lens hardly perceives the variation of arrangement pattern and little suffers from deterioration of visibility.

On the other hand, the dot-portion group D includes, in the circumferential direction S, a plurality of arrangement patterns which differ in the arrangement of dot portions 15 in the diametrical direction M. Further, as in the arrangement pattern shown by the symbol L3 in FIG. 1, dot portions are arranged randomly in the circumferential direction S in the surrounding area B. Accordingly, the wearer of the spectacle lens hardly perceives the variation of arrangement pattern also in the circumferential direction S and little suffers from deterioration of visibility.

Second Embodiment

The second embodiment of the present disclosure will now be described. Prior to the description of details of the second embodiment, the influence of a protruding structure, provided on a lens body, on contrast will be described first.

FIG. 8 shows diagrams illustrating, based on an autocorrelation method, an influence exerted on contrast by a protruding structure provided in a spectacle lens and having a protruding shape in a cross-section in the diametrical direction M.

FIGS. 8(A) and 8(B) illustrate a protruding structure 15P having a rectangular shape in a cross-section in the diametrical direction.

In the first embodiment described above, dot portions are moved in such a manner as to cancel out the elongation of light flux by 1/cos α in a peripheral portion of the spectacle lens. This enables the spectacle lens to respond to the change of light flux on the spectacle lens, corresponding to light flux that enters an eye of the wearer through dot portions of the surrounding area. According to the concept of an autocorrelation method, which is one of MTF calculation techniques, the contrast at a frequency F1 decreases in proportion to "the square of the area of the shaded region/÷the lateral width of the shaded region". As shown in FIG. 8(A), the shaded region shown in FIG. 8(B) corresponds to the difference between the original position of the protruding structure 15P and the position of the protruding structure 15P, shown by the symbol 15a, after the protruding structure 15P is moved in the diametrical direction M by a distance m1 corresponding to the MTF calculation frequency F1.

The consideration made above with reference to FIGS. 8(A) and 8(B) holds true for a protruding structure provided in a surrounding area of a spectral lens and having a trapezoidal shape in a cross-section in the diametrical direction M. FIGS. 8(C) and 8(D) are diagrams illustrating, based on the autocorrelation method, an influence exerted on contrast by a change in the position of a protruding structure 15M provided in a spectacle lens and having a trapezoidal shape in a cross-section in the diametrical direction M.

The protruding structure 15M has, at the periphery, an inclined portion(s) 15Ma whose thickness decreases outwardly. The outermost position of the inclined portion 15Ma in the diametrical direction M of the lens body lies at a distance m0 from the corresponding outermost position of the protruding structure 15P.

Also in this case, the contrast at a frequency F1 decreases in proportion to "the square of the area of the shaded region/the lateral width of the shaded region". As shown in FIG. 8(C), the shaded region shown in FIG. 8(D) corresponds to the difference between the original position of the protruding structure 15M and the position of the protruding structure 15M, shown by the symbol 15Ma, after the protruding structure 15M is moved in the diametrical direction M by a distance m2. The present inventor, based on this fact, has found that introduction of a shape, which makes the lateral width of the shaded region large, to a protruding structure enables preventing an excessive reduction in low-frequency contrast.

For example, assuming a pupil diameter of 4 mm, a wavelength of 555 nm, and a frequency F1 of 7 cpd (cycle per degree), and taking a cutoff frequency into consideration, the corresponding distances m1 and m2 are determined to be about 5.6% of the diameter of light flux on the spectacle lens in the contrast calculation direction.

In the second embodiment, therefore, dot portions 15 of the surrounding area B, at least at their peripheries in the diametrical direction M, have inclined portions. Thus, the second dot-portion group D2 includes inclined dot portions which each have, at the periphery, an inclined portion(s) whose thickness decreases outwardly in the diametrical direction M, and which each have a length which is longer than the corresponding length of each dot portion of the first dot-portion group in the diametrical direction of the lens body.

FIG. 9 shows an A-A' cross-sectional view of a spectacle lens 10B according to the second embodiment of the present disclosure, and partially enlarged views thereof. A schematic plan view of the spectacle lens 10B is the same as FIG. 1.

As shown in FIG. 9, dot portions (inclined dot portions) 15d1, 15d2 . . . , each having a trapezoidal shape in a cross-section in the diametrical direction M, are provided in the surrounding area B and are arranged in a pattern in which at least one of two adjacent inclined dot portions has been moved in the diametrical direction M to form a coupled dot portion 15D.

Coupled dot portions 15D are formed by moving part of dot portions as in the first embodiment, or by forming inclined portions 15ds at the peripheries of dot portions as in the second embodiment. The other structure of the spectacle lens 10B is the same as the spectacle lens 10A shown in FIG. 2.

FIG. 10 shows diagrams illustrating exemplary configurations of a coupled dot portion 15D. A coupled dot portion 15D may have a configuration in which adjacent dot portions are in contact with each other at a contact point 20a, as shown in FIG. 10(B), by moving part of dot portions, which are arranged with an equal spacing g1 in the diametrical direction M, in the diametrical direction M as shown by broken lines in FIG. 10(A). As shown in FIG. 10(C), a coupled dot portion 15D may have a configuration in which peripheral portions of adjacent dot portions overlap each other as shown by the symbol 20b. By moving a dot portion in the diametrical direction M, the distance between the periphery of the dot portion that has moved and the periphery of an adjacent dot portion that has not moved is increased to g2 which is larger than the original distance g1.

When adjacent dot portions are made to contact or overlap each other to obtain a coupled dot portion 15D, the opposing wall surfaces of the dot portions either diminish or disappear. This contributes to achieving the effect of preventing stray light.

As shown in FIG. 10(D), it is possible to use a dot-pair configuration in which adjacent dot portions are slightly spaced apart from each other (at a distance shown by the symbol g3 in FIG. 10(D)). Such a configuration may also achieve the effect of preventing excessive reduction in low-frequency contrast and the effect of preventing stray light to a certain extent. The closest portions of adjacent dot portions are shown by the symbol 20c in FIG. 10(D). The distance between the peripheries of dot portions in the diametrical direction M may be set to be, for example, about 0.56% of the diameter of light flux (about 0.022 mm) or, for example, about 0.015 to 0.030 mm as the shortest distance between dot portions that achieves the same effect as a coupled dot portion. The value may be changed depending on a spatial frequency of interest.

As shown in FIG. 10(E), it is also possible to use a dot portion having a plan-view shape with an aspect ratio of less than 1, more specifically a shape which is elongated in the diametrical direction of the spectacle lens (such as an elliptical shape, a gourd shape, or a rectangular shape). In this case, the aspect ratio of a dot portion is defined as "length w in the circumferential direction S (corresponding to the short axis)/length d1 in the diametrical direction M (corresponding to the long axis)", and is less than 1. An exemplary aspect ratio of a dot portion, having a plan-view shape with an aspect ratio of less than 1, is about 0.45 to 0.99. Also for a coupled dot portion 15D as shown in FIG. 10(A) or 10(B), the aspect ratio w/d1 (w is the maximum length in the circumferential direction S, and d1 is the length in the diametrical direction M) is less than 1, or about 0.45 to 0.99.

In one embodiment, the dot-portion pairs shown in FIGS. 10(B) through 10(D) and the dot portion having a plan-view shape with an aspect ratio of less than 1, shown in FIG. 10(E) are formed by providing an inclined portion(s) to the periphery of a dot portion in the diametrical direction M as described above. Such a dot portion or a dot-portion pair enables more efficiently preventing stray light in the surrounding area of the spectacle lens.

An inclined dot portion may be formed, for example, by using a mold, or by superimposing of ejected dots by IJ printing.

A dot portion having a plan-view shape with an aspect ratio of less than 1 may have an elliptical shape, a gourd shape, or a rectangular shape. A coupled dot portion may be formed by ejecting ink dots simultaneously or successively by IJ printing.

The above-described dot-portion group D according to the first embodiment may be regarded as including dot portions having a plan-view shape with an aspect ratio of less than 1.

FIG. 11 is a graph showing the influence of the diametrical length of an inclined side portion of a protruding structure on the diameter of light flux on the spectacle lens 10A. The graph is obtained by performing a simulation according to the below-described basic conditions of the MTF measurement.

A shift amount of a dot portion, which is necessary to completely prevent variation of the contrast reduction property, is indicated by the curve (1) shown by the solid line in FIG. 11.

In the case where the variation of the contrast reduction property is halved as compared to the case of no provision of a contrast adjustment section from the viewpoint of a balance between the contrast adjustment function and the ease of the formation of a contrast adjustment section, the necessary shift amount of a dot portion is indicated by the curve (2) shown by the broken line in FIG. 11.

As apparent from FIG. 11, in the case where a necessary variation of the contrast reduction property is about halved, the amount of movement of each dot portion or the percentage of dot portions to be moved becomes small. Thus, the percentage of coupled dot portions or dot portions having a shape which is elongated in the diametrical direction is reducible.

FIG. 12 shows diagrams illustrating the workings of a protruding structure provided in a spectacle lens and having a trapezoidal shape in diametrical cross-section.

As shown in FIG. 12(A), in the case of a protruding structure 15P having no peripheral inclined portion and having a rectangular shape in a cross-section in the diametrical direction, light is likely to be reflected from the wall surface of the dot portion in a surrounding area of the spectacle lens, whereby stray light is likely to be generated.

On the other hand, as shown in FIG. 12(B), in the case of a protruding structure 15M having an inclined portion 15Ma at the periphery of the dot portion in the diametrical direction M, light is unlikely to be reflected from the wall surface of the dot portion even in a surrounding area of the spectacle lens. Thus, light rays may be prevented from becoming stray light.

In the above-described second embodiment, in the surrounding area B, dot portions are arranged in an arrangement pattern in which part of the dot portions have been moved, and coupled dot portions have been formed by providing an inclined portion at the periphery of each dot portion. This makes it possible to fully ensure the contrast reduction effect for the entire spectacle lens including the surrounding area B, and to prevent the generation of stray light.

However, in a spectacle lens for use in an application for which a reduction in contrast does not matter much, it is possible to arrange dot portions isotropically over the entire spectacle lens, and to provide a peripheral inclined portion to dot portions only in a surrounding area to prevent stray light.

Details of the structure of layers of a spectacle lens will now be described.

<Exemplary Structure of Layers of Spectacle Lens>

FIG. 13 is a partially enlarged diametrical cross-sectional view showing the structure of layers of a spectacle lens 10A1.

The spectacle lens 10A1 shown in FIG. 13 includes a spectacle lens substrate 11 (hereinafter also referred to simply as the "lens substrate"), and a hard coat layer 13, the above-described metal-containing layer 15b (20), an antireflective layer 17 and a water-repellent layer 19, disposed in this order on a first main surface of the lens substrate 11. The layers other than the metal-containing layer 15b will be described.

<Lens Substrate>

As shown in FIG. 13, the lens substrate 11 has a first main surface 111, a second main surface 112, and an edge surface (not shown).

The lens substrate 11 may be made of a plastic material or an inorganic glass. Examples of the material of the substrate include a polyurethane material such as a polythiourethane resin or a polyurethane resin, an epithio material such as a polysulfide resin, a polycarbonate material, and a diethylene glycol bisallyl carbonate material.

While a colorless substrate is generally used as the lens substrate 11, a colored substrate may also be used as long as the transparency is not impaired.

The refractive index of the lens substrate 11 is, for example, not less than 1.50 and not more than 1.74.

The lens substrate 11 may be either a finished lens or a semifinished lens.

There is no particular limitation on the surface shape of the lens substrate 11; the lens substrate 11 may have any of a plane surface, a convex surface, a concave surface, etc.

The eyeglass lens of the present disclosure may be any of a unifocal lens, a multifocal lens, a progressive power lens, etc. In the case of a progressive power lens, in general, a near vision zone and a transition zone (intermediate zone) are included in a lower area, while a distance vision zone is included in an upper area.

<Hard Coat Layer>

The hard coat layer 13 is formed, for example, by curing a curable composition comprising inorganic oxide particles and a silicon compound. The composition of the hard coat layer 13 is selected depending on the material of the lens substrate 11. The refractive index (nD) of the hard coat layer 13 is, for example, not less than 1.50 and not more than 1.74.

<Antireflective Layer>

The antireflective layer 17 is a film having a multi-layer structure consisting of laminated layers with different refractive indices and which prevents reflection of light through an interference effect. An example of the antireflective layer 17 is a multi-layer laminate of low-refractive index layers 17L and high-refractive index layers 17H. The refractive index of each low-refractive index layer 17L is, for example, 1.35 to 1.80 at a wavelength of 500 to 550 nm. The refractive index of each high-refractive index layer 17H is, for example, 1.90 to 2.60 at a wavelength of 500 to 550 nm.

The low-refractive index layers 17L are made of, for example, silicon dioxide ($SiO_2$) having a refractive index of about 1.43 to 1.47. The high-refractive index layers 17H are made of a material having a higher refractive index than the low-refractive index layers 17L. For example, a mixture of metal oxides, selected from niobium oxide ($Nb_2O_5$), tantalum oxide ($Ta_2O_5$), titanium oxide ($TiO_2$), zirconium oxide ($ZrO_2$), yttrium oxide ($Y_2O_3$) and aluminum oxide ($Al_2O_3$), with an appropriate mixing ratio may be used as the material.

<Water-Repellent Layer>

The water-repellent layer 19 comprises, for example, an organosilicon compound containing a fluorine-substituted alkyl group. The water-repellent layer 19 has such a thickness as to perform an antireflective function together with the antireflective layer 17.

<Another Exemplary Structure of Layers on Spectacle Lens>

FIG. 14 is a partially enlarged diametrical cross-sectional view showing the structure of layers on a spectacle lens 10A2.

The second spectacle lens 10A2 has basically the same structure as the spectacle lens 10A1, and a plan view of the spectacle lens 10A2 is the same as the plan view of the spectacle lens 10A1, shown in FIG. 1.

As shown in FIG. 14, the spectacle lens 10A2 includes a spectacle lens substrate 11 (hereinafter also referred to simply as the "lens substrate"), and a hard coat layer 13, a first inorganic layer 15c, a metal-containing layer 15b, a second inorganic layer 15e, an antireflective layer 17 and a water-repellent layer 19, disposed in this order on a first main surface of the lens substrate 11.

The first inorganic layer 15c is formed between the metal-containing layer 15b and the first main surface of the lens substrate 11, and is not formed in the openings. The provision of the first inorganic layer 15c may prevent peeling of the metal-containing layer 15b during the process of producing the spectacle lens 10A2.

The second inorganic layer 15e is formed on the metal-containing layer 15b, and is not formed in the openings. The provision of the second inorganic layer 15e may prevent wear of the metal-containing layer 15b during the process of producing the spectacle lens 10A2, thereby preventing a decrease in the transmittance of the metal-containing layer 15b.

The first inorganic layer 15c and the second inorganic layer 15e (hereinafter referred to simply as the "inorganic layer" which is a broader concept's term) may be formed of, for example, an inorganic oxide.

The thickness of the inorganic layer is, for example, 1 to 100 nm, or 1 to 50 nm.

Examples of the material of the inorganic layer may include $SiO_2$, $Al_2O_3$, $Ta_2O_5$, $Nb_2O_5$, $ZrO_2$, $TiO_2$, $In_2O_3/SiO_2$ (ITO), and $CeO_2$.

They may include, $SiO_2$ and $Al_2O_3$, or $SiO_2$.

The inorganic layer may be formed by any known film-forming method. A vacuum vapor-deposition method, for example, may be used.

The same material as the material of the lowermost layer of the antireflective layer 17 may be used for the inorganic layer. This enables reducing the occurrence of a problem, such as interference, associated with the lowermost layer of the antireflective layer 17.

<Simulation>

Using a model having the same structure as the spectacle lens of the above-described embodiment, a simulation was conducted to determine the influence of a dot-portion group, constituting a contrast adjustment section, on the contrast of a spectacle lens.

The basic conditions of the simulation are as follows.
Pitch of dot portions: 0.500 mm
Diameter of each dot portion: 0.350 mm
Spacing between the peripheries of dot portions: 0.150 mm Phase loading: 0.15λ
Transmittance: 100%
Wavelength: 555 nm
Assumed pupil diameter: 4 mm FIG. 15 is a diagram showing the results of the simulation of the MTF characteristics of a spectacle lens having dot portions arranged non-uniformly.

The following conditions were set for a pattern of non-uniform arrangement of the dot portions.

[1A] At a location where the diameter of light flux doubles in the diametrical direction, every dot portion is in contact with an adjacent dot portion in the diametrical direction (the distance between closest dot portions is 0 mm); that is, every dot portion constitutes a coupled dot portion. The dot portions do not have any peripheral inclined portion, i.e., do not include inclined dot portions.

[2A] At a location where the diameter of light flux reaches 1.4 times in the diametrical direction, the positions of dot portions are set randomly such that the average distance between closest dot portions in the diametrical direction is 0.090 mm. 16% of the dot portions are coupled dot portions each consisting of two dot portions in contact with each other in the diametrical direction. The dot portions have a peripheral inclined portion, i.e., include inclined dot portions. The average length of the inclined portion in the diametrical direction is 0.043 mm.

As can be seen in FIG. 15, compared to a spectacle lens having no dot portions as a control, the contrast decreases with increase in spatial frequency both in a central area and in a surrounding area. The degrees of decrease in the contrast, i.e. the degrees of the change with spatial frequency in these areas are very similar to each other. In FIG. 15, the dotted line indicates the characteristic of the spectacle lens having no dot portions. The solid line indicates the characteristics of the central area or the surrounding area, in the circumferential direction, of the spectacle lens having dot portions. The long broken line indicates the characteristics of the central area or the surrounding area, in the circumferential direction, of the spectacle lens having dot portions in the case where the diameter of light flux is 1.4 times larger. The dash-dot-dot-dash line indicates the characteristics of the central area or the surrounding area, in the circumferential direction, of the spectacle lens having dot portions in the case where the diameter of light flux is 2 times larger. The same holds true for the below-described FIGS. 16 through 18.

FIG. 16 is a diagram showing the simulation results of FIG. 15, with the ordinate axis representing the degree of reduction of contrast compared to the spectacle lens having no dot portions.

As apparent from FIG. 16, while the differences between the respective curves are enhanced by taking the degree of reduction of contrast as the ordinate, the degree of reduction of contrast is approximately equal for any of the locations in the spectacle lens.

FIG. 17 is a diagram showing the results of a simulation of the MTF characteristics of a spectacle lens having dot portions arranged non-uniformly in a pattern different from the case of FIG. 16, with the ordinate axis representing the degree of reduction of contrast compared to a spectacle lens having no dot portions.

The following conditions [1B] to [3B] were set for a pattern of non-uniform arrangement of the dot portions.

[1B] The proportion of coupled dot portions was set to be "light-flux diameter magnification factor−1".

[2B] At a location where the diameter of light flux is 2 times larger in the diametrical direction, every dot portion is in contact with an adjacent dot portion in the diametrical direction (the distance between closest dot portions is 0 mm); that is, every dot portion constitutes a coupled dot portion. The dot portions do not have any peripheral inclined portion, i.e., do not include inclined dot portions.

[3B] At a location where the diameter of light flux is 1.4 times larger in the diametrical direction, the positions of dot portions are set randomly such that the average distance between closest dot portions in the diametrical direction is 0.090 mm. 40% of the dot portions are coupled dot portions each consisting of two dot portions in contact with each other in the diametrical direction. The dot portions do not have any peripheral inclined portion, i.e., do not include inclined dot portions.

As apparent from FIG. 17, the contrast reduction behaviors at the respective locations are very similar to each other, indicating that position-dependent variation in the contrast reduction effect is prevented.

FIG. 18 is a diagram showing the results of a simulation of the MTF characteristics of a spectacle lens having dot portions arranged isotropically and uniformly, with the ordinate axis representing the degree of reduction of contrast compared to a spectacle lens having no dot portions.

As apparent from FIG. 18, the degree of reduction of contrast varies among the locations in the spectacle lens. Further, the change of contrast with spatial frequency is large as compared to the characteristics shown in FIGS. 16 and 17.

<Another Arrangement Pattern>

In the arrangement patterns P2 and P3 shown in FIG. 1, dot portions are arranged randomly in the diametrical direction M and in the circumferential direction S in order to avoid causing an uncomfortable feeling to the wearer as much as possible. However, it is also possible to form a pseudo-irregular pattern by moving dot portions more regularly.

FIG. 19 is a schematic plan view of a spectacle lens 10C according to another embodiment of the present disclosure.

As shown in FIG. 19, in the spectacle lens 10C, the arrangement pattern of the first dot-portion group D1 of the central area A and the arrangement pattern of the third dot-portion group D3 of the surrounding area B2 located just outside the central area A are both a regular arrangement pattern P1.

The arrangement pattern P2 of the second dot-portion group D2 of the surrounding area B1 located outside the surrounding area B2 is a pseudo-irregular pattern corresponding to an arrangement pattern in which dot portions located in a predetermined row and outer rows have been simply moved in the diametrical direction M to form coupled dot portions 15D. Such a pseudo-irregular pattern is easy to determine and form.

The above-described examples and exemplary ranges of the respective components and their contents and physical properties may be arbitrarily combined.

Further, by adjusting a composition as described in the working examples to make it relevant to a composition as described in the detailed description, the disclosed embodiment may be carried out as in the working examples for the entire scope of the claimed composition.

Lastly, the embodiment of the present disclosure will be summarized with reference to the drawings.

As shown in FIGS. 1, 2 and 6, the spectacle lens 10A according to an embodiment of the present disclosure includes the lens substrate 11, constituting a lens body, and the contrast adjustment section 30 provided on the lens substrate 11 and including the dot-portion group D in which dot portions 15 are arranged, and has an area in which dot portions 15 arranged in a non-uniform arrangement pattern P2. Non-uniform arrangement of dot portions 15 makes it possible to fully ensure the contrast reduction effect for the entire spectacle lens including the surrounding area B.

As shown in FIGS. 1, 6, 9 and 10, the spectacle lens 10B according to another embodiment of the present disclosure includes the contrast adjustment section including a dot-portion group consisting of an arrangement of dot portions. The dot-portion group includes dot portions each having a plan-view shape with an aspect ratio of less than 1. The inclusion of dot portions, each having a plan-view shape with an aspect ratio of less than 1, in the dot-portion group enables preventing the generation of stray light while maintaining the contrast reduction effect.

The spectacle lens of the present disclosure is applicable not only to daily-use visual correction glasses for near-sightedness, far-sightedness, astigmatism or presbyopia, protective glasses for protecting eyes, and magnifying glasses, but also to various other types of spectacle lenses, including an optical spectacle lens for a head mount display (HMD).

The embodiments disclosed herein should be construed merely exemplary and not limitative in every way. It is intended that the scope of the present invention is defined not by the description given above but by the claims, and includes changes and modifications made within the meaning and scope of the claims and their equivalents.

EXPLANATION OF THE SYMBOLS 10A, 10A1, 10A2, 10B, 10C: spectacle lens
11: lens substrate (lens body)
13: hard coat layer
15: dot portion
15b, 20: metal-containing layer
15D: coupled dot portion
15d1, 15d2: inclined dot portion
17: antireflective layer
17L: low-refractive index layer
17H: high-refractive index layer
19: water-repellent layer
30: contrast adjustment section
A: central area
B, B1, B2: surrounding area
D1: first dot-portion group
D2: second dot-portion group
D3: third dot-portion group
P1, P2, P3: arrangement pattern
L1: first arrangement
L2: second arrangement
M: diametrical direction
S: circumferential direction
g1, g2. g3: distance between the peripheries of dot portions in the diametrical direction M
d1: length of a dot portion in the diametrical direction M
w: length of a dot portion in the circumferential direction S
r: diameter of a dot portion

The invention claimed is:

1. A spectacle lens comprising:
a lens body; and
a contrast adjustment section provided on or in the lens body and comprising a dot-portion group in which dot portions are arranged,
wherein the dot-portion group comprises a first dot-portion group lying in a central area of the lens body, and a second dot-portion group lying in a surrounding area located outside the central area, dot portions in the first dot-portion group are arranged in an isotropic arrangement pattern and dot portions in the second dot-portion group are arranged in a non-uniform arrangement pattern, and
wherein a comparison between the first dot-portion group and the second dot-portion group results in at least one of: (i) the distances between adjacent dot portions in a diametrical direction of the lens body being longer in the second-dot portion group than in the first-dot portion group; and (ii) the lengths of the dot portions in the diametrical direction of the lens body being longer in the second-dot portion group than in the first dot-portion group.

2. The spectacle lens according to claim 1, wherein the dot-portion group includes dot portions each having an aspect ratio of less than 1, the aspect ratio being a ratio of the length in a short-axis direction to the length in a long-axis direction in a plan-view shape.

3. The spectacle lens according to claim 1, wherein the dot-portion group comprises a first arrangement and a second arrangement which differ in the arrangement of dot portions in the diametrical direction of the lens body, and which are located at different positions in the circumferential direction of the lens body.

4. The spectacle lens according to claim 1, wherein the dot portions are recessed portions formed in the contrast adjustment section.

5. The spectacle lens according to claim 1, wherein compared to the first dot-portion group, the distances between adjacent dot portions in the diametrical direction of the lens body are longer in the second dot-portion group.

6. The spectacle lens according to claim 5, wherein the arrangement of the dot portions of the second dot-portion group corresponds to an arrangement in which dot portions in predetermined positions of the arrangement of the dot portions of the first dot-portion group have been moved in the diametrical direction of the lens body.

7. The spectacle lens according to claim 5, wherein the dot-portion group further comprises a third dot-portion group lying in an intermediate area located between the central area and the surrounding area, and wherein in the third dot-portion group, the distance between dot portions in the diametrical direction of the lens body is intermediate between the corresponding distance between dot portions in the first dot-portion group and the corresponding distance between dot portions in the second dot-portion group.

8. A spectacle lens comprising:
a lens body; and
a contrast adjustment section provided on or in the lens body and comprising a dot-portion group in which dot portions are arranged,
wherein the dot-portion group comprises dot portions each having an aspect ratio, which is a ratio of the length in the short-axis direction to the length in the long-axis direction in the plan-view shape, of less than 1,
wherein the dot-portion group comprises a first dot-portion group lying in a central area of the lens body, and a second dot-portion group lying in a surrounding area located outside the central area, dot portions in the first dot-portion group are arranged in an isotropic arrangement pattern and dot portions in the second dot-portion group are arranged in a non-uniform arrangement pattern, and wherein a comparison between the first dot-portion group and the second dot-portion group results in at least one of: (i) the distances between adjacent dot portions in a diametrical direction of the lens body being longer in the second-dot portion group than in the first-dot portion group; and (ii) the lengths of the dot portions in the diametrical direction of the lens body being longer in the second-dot portion group than in the first dot-portion group.

9. The spectacle lens according to claim 8, wherein the dot-portion group comprises a first arrangement and a second arrangement which differ in the arrangement of dot portions in the diametrical direction of the lens body, and which are located at different positions in the circumferential direction of the lens body.

10. The spectacle lens according to claim 8, wherein the dot portions are recessed portions formed in the contrast adjustment section.

11. The spectacle lens according to claim 8, wherein compared to the first dot-portion group, the lengths of dot portions in the diametrical direction of the lens body are longer in the second dot-portion group.

12. The spectacle lens according to claim 11, wherein the second dot-portion group includes pairs of dot portions coupled together, and wherein each dot-portion pair forms a coupled dot portion whose length in the diametrical direction of the lens body is longer than the corresponding length of each of the dot portions constituting the dot-portion pair.

13. The spectacle lens according to claim 11, wherein the second dot-portion group includes inclined dot portions which each have, at the periphery, an inclined portion whose thickness decreases outwardly in the diametrical direction of the lens body, and which each have a length which is longer than the corresponding length of each dot portion of the first dot-portion group in the diametrical direction of the lens body.

14. The spectacle lens according to claim 11, wherein the dot-portion group further comprises a third dot-portion group lying in an intermediate area located between the central area and the surrounding area, and wherein in the third dot-portion group, the length of each dot portion in the diametrical direction of the lens body is intermediate between the corresponding length of each dot portion of the first dot-portion group and the corresponding length of each dot portion of the second dot-portion group.

15. The spectacle lens according to claim 11, wherein compared to the first dot-portion group, the distances between adjacent dot portions in the diametrical direction of the lens body are longer in the second dot-portion group.

\* \* \* \* \*